(12) United States Patent     (10) Patent No.:   US 12,610,356 B2

Umeda et al.     (45) Date of Patent:     Apr. 21, 2026

---

(54) ADDITIONAL MAXIMUM POWER REDUCTION BASED ON DIRECT CURRENT LOCATION

(71) Applicant: Nokia Technologies Oy, Espoo (FI)

(72) Inventors: Hiromasa Umeda, Tokyo (JP); Petri Juhani Vasenkari, Espoo (FI); Tero Henttonen, Espoo (FI); Toni Harri Henrikki Lähteensuo, Espoo (FI)

(73) Assignee: Nokia Technologies Oy, Espoo (FI)

( * ) Notice: Subject to any disclaimer, the term of this patent is extended or adjusted under 35 U.S.C. 154(b) by 318 days.

(21) Appl. No.: 18/566,347

(22) PCT Filed: Jun. 2, 2021

(86) PCT No.: PCT/FI2021/050406

§ 371 (c)(1),
(2) Date: Dec. 1, 2023

(87) PCT Pub. No.: WO2022/254078

PCT Pub. Date: Dec. 8, 2022

(65) Prior Publication Data

US 2024/0298272 A1     Sep. 5, 2024

(51) Int. Cl.
*H04W 72/0453*     (2023.01)
*H04W 8/22*     (2009.01)
          (Continued)

(52) U.S. Cl.
CPC ......... *H04W 72/0453* (2013.01); *H04W 8/22* (2013.01); *H04W 52/146* (2013.01); *H04W 52/367* (2013.01)

(58) Field of Classification Search
CPC . H04W 72/0453; H04W 8/22; H04W 52/146; H04W 52/367
See application file for complete search history.

(56) References Cited

U.S. PATENT DOCUMENTS

| | | | |
|---|---|---|---|
| 2013/0044621 A1* | 2/2013 | Jung | ................. H04J 11/005 |
| | | | 370/336 |
| 2015/0289215 A1* | 10/2015 | Kaukovuori | .......... H04W 52/34 |
| | | | 370/329 |

(Continued)

FOREIGN PATENT DOCUMENTS

WO     2019/096396 A1     5/2019

OTHER PUBLICATIONS

"3rd Generation Partnership Project; Technical Specification Group Radio Access Network; NR; User Equipment (UE) radio transmission and reception; Part 1: Range 1 Standalone (Release 16)", 3GPP TS 38.101-1, V16.5.0, Sep. 2020, pp. 1-434.

(Continued)

*Primary Examiner* — Kenny S Lin

(74) *Attorney, Agent, or Firm* — Nokia Technologies Oy

(57) ABSTRACT

Disclosed is a method comprising obtaining information indicating a capability of a terminal device for applying an adjusted additional maximum power reduction. The method further comprises receiving, from the terminal device, a message comprising at least an indication of a direct current location associated with the terminal device. The method further comprises determining, according to one or more pre-defined rules based at least partly on the direct current location, an amount of the adjusted additional maximum power reduction applied by the terminal device.

20 Claims, 14 Drawing Sheets

(51) Int. Cl.
H04W 52/14 (2009.01)
H04W 52/36 (2009.01)

(56) References Cited

U.S. PATENT DOCUMENTS

2016/0112964 A1\* 4/2016 Lim .................. H04W 72/0473
455/452.2
2022/0030525 A1\* 1/2022 Chincholi .............. H04B 17/14

OTHER PUBLICATIONS

"3rd Generation Partnership Project; Technical Specification Group Radio Access Network; NR; User Equipment (UE) radio transmission and reception; Part 2: Range 2 Standalone (Release 17)", 3GPP TS 38.101-2, V17.1.0, Mar. 2021, pp. 1-189.

"3rd Generation Partnership Project; Technical Specification Group Radio Access Network; NR; User Equipment (UE) radio transmission and reception; Part 3: Range 1 and Range 2 Interworking operation with other radios (Release 17)", 3GPP TS 38.101-3, V17.1.0, Mar. 2021, pp. 1-716.

"3rd Generation Partnership Project; Technical Specification Group Radio Access Network; NR; User Equipment (UE) radio access capabilities (Release 16)", 3GPP TS 38.306, V16.4.0, Mar. 2021, pp. 1-151.

"LO location for intra-band UL CA", 3GPP TSG-RAN WG4 Meeting #96, R4-2010049, Agenda item: 7.11.1.2.1, Qualcomm Incorporated, May 2020, 2 pages.

International Search Report and Written Opinion received for corresponding Patent Cooperation Treaty Application No. PCT/FI2021/050406, dated Feb. 23, 2022, 12 pages.

"Changing MPR/A-MPR in the specifications", TSG-RAN Working Group 4 (Radio) meeting #68bis, R4-135264, Agenda item: 6.1, Ericsson, Oct. 7-11, 2013, 3 pages.

"The necessity of UE capability signalling on NS value", 3GPP TSG RAN WG4 Meeting #93, R4-1914128, Agenda item: 7.5.4.5, NTT Docomo, Inc., Nov. 18-22, 2019, pp. 1-11.

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

"3rd Generation Partnership Project; Technical Specification Group Radio Access Network; NR; User Equipment (UE) radio transmission and reception; Part 1: Range 1 Standalone (Release 17)", 3GPP TS 38.101-1, V17.1.0, Mar. 2021, pp. 1-512.

\* cited by examiner

700

800

| 1301 | Indicate capability for adjusted A-MPR |
|------|-----------------------------------------|
| 1302 | Determine amount of adjusted A-MPR |
| 1303 | Determine to apply adjusted A-MPR |
| 1304 | Indicate DC location |

| 1401 | Obtain information indicating UE capability for applying adjusted A-MPR |
|------|--------------------------------------------------------------------------|
| 1402 | Receive message indicating DC location of the UE |
| 1403 | Determine amount of adjusted A-MPR of the UE |

1500

1600

ADDITIONAL MAXIMUM POWER REDUCTION BASED ON DIRECT CURRENT LOCATION

RELATED APPLICATION

This application was originally filed as PCT Application No. PCT/FI2021/050406, filed on Jun. 2, 2021, of which is incorporated herein by reference in its entirety.

FIELD

The following exemplary embodiments relate to wireless communication.

BACKGROUND

As resources are limited, it is desirable to optimize the usage of network resources. A cell and/or a terminal device may be utilized to enable better usage of resources.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: obtain information indicating a capability of a terminal device for applying an adjusted additional maximum power reduction; receive, from the terminal device, a message comprising at least an indication of a direct current location associated with the terminal device; and determine, according to one or more pre-defined rules based at least partly on the direct current location, an amount of the adjusted additional maximum power reduction applied by the terminal device.

According to another aspect, there is provided an apparatus comprising means for: obtaining information indicating a capability of a terminal device for applying an adjusted additional maximum power reduction; receiving, from the terminal device, a message comprising at least an indication of a direct current location associated with the terminal device; and determining, according to one or more pre-defined rules based at least partly on the direct current location, an amount of the adjusted additional maximum power reduction applied by the terminal device.

According to another aspect, there is provided a method comprising: obtaining information indicating a capability of a terminal device for applying an adjusted additional maximum power reduction; receiving, from the terminal device, a message comprising at least an indication of a direct current location associated with the terminal device; and determining, according to one or more pre-defined rules based at least partly on the direct current location, an amount of the adjusted additional maximum power reduction applied by the terminal device.

According to another aspect, there is provided a computer program comprising instructions for causing an apparatus to perform at least the following: obtain information indicating a capability of a terminal device for applying an adjusted additional maximum power reduction; receive, from the terminal device, a message comprising at least an indication of a direct current location associated with the terminal device; and determine, according to one or more pre-defined rules based at least partly on the direct current location, an amount of the adjusted additional maximum power reduction applied by the terminal device.

According to another aspect, there is provided a computer readable medium comprising program instructions for causing an apparatus to perform at least the following: obtain information indicating a capability of a terminal device for applying an adjusted additional maximum power reduction; receive, from the terminal device, a message comprising at least an indication of a direct current location associated with the terminal device; and determine, according to one or more pre-defined rules based at least partly on the direct current location, an amount of the adjusted additional maximum power reduction applied by the terminal device.

According to another aspect, there is provided a non-transitory computer readable medium comprising program instructions for causing an apparatus to perform at least the following: obtain information indicating a capability of a terminal device for applying an adjusted additional maximum power reduction; receive, from the terminal device, a message comprising at least an indication of a direct current location associated with the terminal device; and determine, according to one or more pre-defined rules based at least partly on the direct current location, an amount of the adjusted additional maximum power reduction applied by the terminal device.

According to another aspect, there is provided an apparatus comprising at least one processor, and at least one memory including computer program code, wherein the at least one memory and the computer program code are configured, with the at least one processor, to cause the apparatus to: indicate, to a network element of a wireless communication network, a capability for applying an adjusted additional maximum power reduction, wherein the capability is indicated by transmitting a first message; determine an amount of the adjusted additional maximum power reduction according to one or more pre-defined rules based at least partly on a direct current location; determine to apply the adjusted additional maximum power reduction with the determined amount; and transmit, to the network element, a second message comprising at least an indication of the direct current location.

According to another aspect, there is provided an apparatus comprising means for: indicating, to a network element of a wireless communication network, a capability for applying an adjusted additional maximum power reduction, wherein the capability is indicated by transmitting a first message; determining an amount of the adjusted additional maximum power reduction according to one or more pre-defined rules based at least partly on a direct current location; determining to apply the adjusted additional maximum power reduction with the determined amount; and transmitting, to the network element, a second message comprising at least an indication of the direct current location.

According to another aspect, there is provided a method comprising: indicating, to a network element of a wireless communication network, a capability for applying an adjusted additional maximum power reduction, wherein the capability is indicated by transmitting a first message; determining an amount of the adjusted additional maximum power reduction according to one or more pre-defined rules based at least partly on a direct current location; determining to apply the adjusted additional maximum power reduction with the determined amount; and transmitting, to the network element, a second message comprising at least an indication of the direct current location.

According to another aspect, there is provided a computer program comprising instructions for causing an apparatus to perform at least the following: indicate, to a network element of a wireless communication network, a capability for applying an adjusted additional maximum power reduction, wherein the capability is indicated by transmitting a first message; determine an amount of the adjusted additional maximum power reduction according to one or more pre-defined rules based at least partly on a direct current location; determine to apply the adjusted additional maximum power reduction with the determined amount; and transmit, to the network element, a second message comprising at least an indication of the direct current location.

According to another aspect, there is provided a computer readable medium comprising program instructions for causing an apparatus to perform at least the following: indicate, to a network element of a wireless communication network, a capability for applying an adjusted additional maximum power reduction, wherein the capability is indicated by transmitting a first message; determine an amount of the adjusted additional maximum power reduction according to one or more pre-defined rules based at least partly on a direct current location; determine to apply the adjusted additional maximum power reduction with the determined amount; and transmit, to the network element, a second message comprising at least an indication of the direct current location.

According to another aspect, there is provided a non-transitory computer readable medium comprising program instructions for causing an apparatus to perform at least the following: indicate, to a network element of a wireless communication network, a capability for applying an adjusted additional maximum power reduction, wherein the capability is indicated by transmitting a first message; determine an amount of the adjusted additional maximum power reduction according to one or more pre-defined rules based at least partly on a direct current location; determine to apply the adjusted additional maximum power reduction with the determined amount; and transmit, to the network element, a second message comprising at least an indication of the direct current location.

According to another aspect, there is provided a system comprising at least a terminal device and a network element of a wireless communication network. The terminal device is configured to: indicate, to the network element, a capability for applying an adjusted additional maximum power reduction, wherein the capability is indicated by transmitting a first message; determine an amount of the adjusted additional maximum power reduction according to one or more pre-defined rules based at least partly on a direct current location; determine to apply the adjusted additional maximum power reduction with the determined amount; and transmit, to the network element, a second message comprising at least an indication of the direct current location. The network element is configured to: obtain information indicating the capability of the terminal device for applying the adjusted additional maximum power reduction; receive, from the terminal device, the second message comprising at least the indication of the direct current location; and determine, according to the one or more pre-defined rules based at least partly on the direct current location, the amount of the adjusted additional maximum power reduction applied by the terminal device.

According to another aspect, there is provided a system comprising at least a terminal device and a network element of a wireless communication network. The terminal device comprises means for: indicating, to the network element, a capability for applying an adjusted additional maximum power reduction, wherein the capability is indicated by transmitting a first message; determining an amount of the adjusted additional maximum power reduction according to one or more pre-defined rules based at least partly on a direct current location; determining to apply the adjusted additional maximum power reduction with the determined amount; and transmitting, to the network element, a second message comprising at least an indication of the direct current location. The network element comprises means for: obtaining information indicating the capability of the terminal device for applying the adjusted additional maximum power reduction; receiving, from the terminal device, the second message comprising at least the indication of the direct current location; and determining, according to the one or more pre-defined rules based at least partly on the direct current location, the amount of the adjusted additional maximum power reduction applied by the terminal device.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
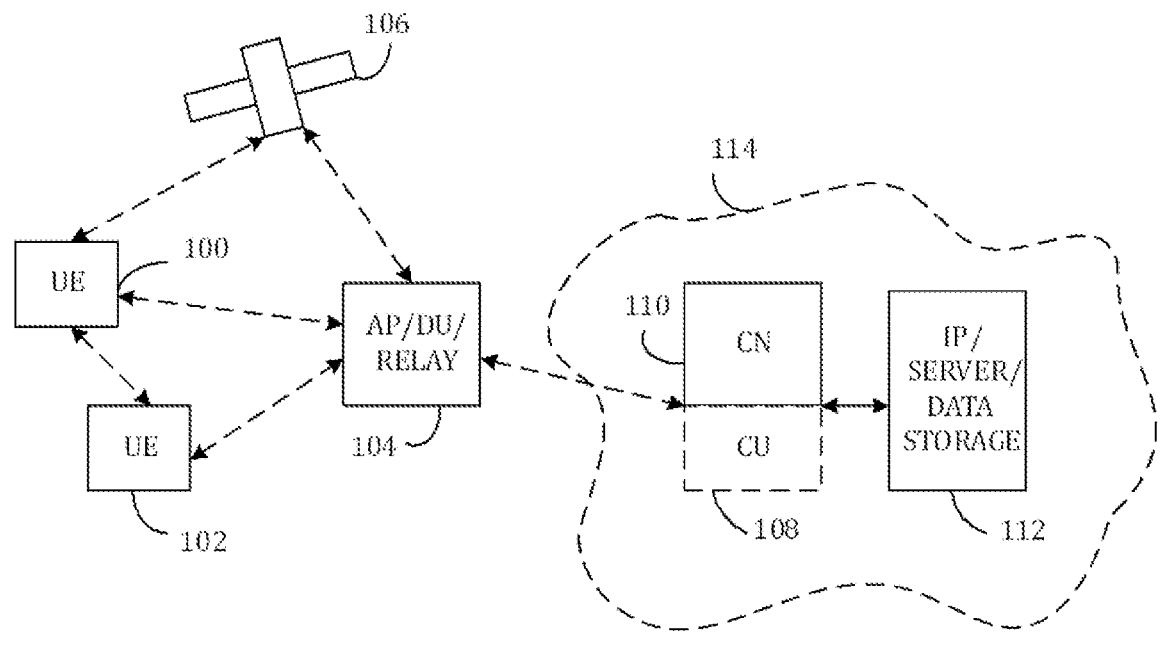
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g) NodeB may be called uplink or reverse link and the physical link from the (e/g) NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The (e/g) NodeB may also be referred to as a base station, an access point or any other type of interfacing device including a relay station capable of operating in a wireless environment. The (e/g) NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g) NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station. The self-backhauling relay node may also be called an integrated access and backhaul (IAB) node. The IAB node may comprise two logical parts: a mobile termination (MT) part, which takes care of the backhaul link(s) (i.e. link(s) between IAB node and a donor node, also known as a parent node) and a distributed unit (DU) part, which takes care of the access link(s), i.e. child link(s) between the IAB node and UE(s) and/or between the IAB node and other IAB nodes (multi-hop scenario).

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G may enable using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual subnetworks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a central unit, CU 108) may be enabled for example by application of cloud-RAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR)

networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home(e/g)nodeB.

Furthermore, the (e/g)nodeB or base station may also be split into: a radio unit (RU) comprising a radio transceiver (TRX), i.e. a transmitter (TX) and a receiver (RX); one or more distributed units (DUs) that may be used for the so-called Layer 1 (L1) processing and real-time Layer 2 (L2) processing; and a central unit (CU) or a centralized unit that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP) and/or packet data convergence protocol (PDCP), of the (e/g)nodeB or base station. The DU may be defined as a logical node hosting radio link control (RLC), medium access control (MAC) and/or physical (PHY) layers of the (e/g)nodeB or base station. The operation of the DU may be at least partly controlled by the CU. The CU may comprise a control plane (CU-CP), which may be defined as a logical node hosting the RRC and the control plane part of the PDCP protocol of the CU for the (e/g)nodeB or base station. The CU may further comprise a user plane (CU-UP), which may be defined as a logical node hosting the user plane part of the PDCP protocol and the SDAP protocol of the CU for the (e/g)nodeB or base station.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customerspecific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be needed to provide such a network structure.

For fulfilling the need for improving the deployment and performance of communication systems, the concept of "plug-and-play" (e/g)NodeBs may be introduced. A network which may be able to use "plug-and-play" (e/g)NodeBs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

NR allows wider channel bandwidth (CBW) usage than LTE. For example, the maximum CBW for LTE is 20 MHz for single carrier usage, while the maximum CBW for NR frequency range 1 (FR1) is 100 MHz and the maximum CBW for NR frequency range 2 (FR2) is 400 MHZ. In principle, the wider the CBW becomes, the larger the network (NW) capacity is. However, UEs may not always be able to use the increased spectrum resource within the wider CBW at a time instant in the cell edge, because the UE power is limited by the UE power class (PC), for example 23 dBm for PC3. Thus, the UEs may need to use a lower modulation, such as binary phase-shift keying (BPSK), and/or narrower spectrum resource to increase the power spectral density (PSD). Hence, the UE uplink power has a significant impact on the network capacity and its cell coverage.

Nonetheless, the larger the CBW becomes, the larger the additional maximum power reduction (A-MPR) is, in case A-MPR is allowed for a frequency band in order to meet additional requirements, such as regulatory requirements applicable to some regions and/or countries. A-MPR is the amount by which the UE is allowed to reduce its maximum output power for example in order to be able to meet the additional requirements. The amount of allowed A-MPR may be determined based on the UE CBW, its center frequency, the number of RBs, and the starting point of the RBs.

The root causes of the larger A-MPR may be, for example, due to the following two reasons. One reason is that the wider the CBW becomes, the farther intermodulation (IMD) such as IMD3 is. More specifically, at a time instant, the distance between the direct current (DC) location and the resource block (RB) with the most distance from the DC location has an impact on how far the IMD reaches. IMD refers to signals containing two or more different frequencies caused by nonlinearities or time variance in a system. Due to the imperfect balance between in-phase and quadrature (IQ) paths of the transmitter, an IQ image is generated at the same frequency offset but on the opposite side of the DC location compared to the desired RB(s). The 3rd generation partnership project (3GPP) defines the maximum allowed strength of the IQ image. When the minimum requirements are met, the strongest intermodulation component is the IMD3 between the desired RBs and their image.

Figure 2:
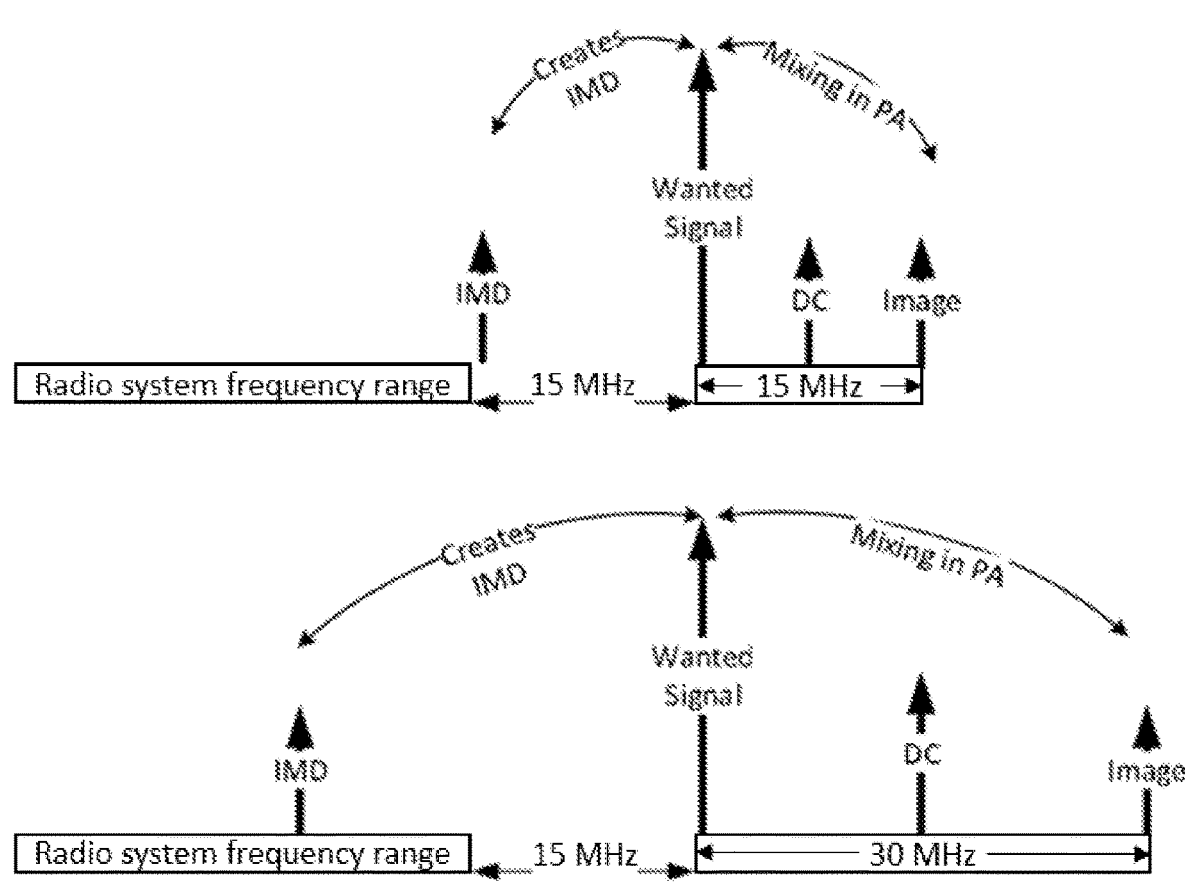
FIG. 2 illustrates the relationship between channel bandwidth and intermodulation.

The second reason is that the additional spectrum emission requirements to protect a radio system and its frequency range are fixed values, unlike general out-of-band emission such as spectrum emission mask, whose requirements are scaled according to the width of the CBW. Since the lower order IMD generally has a larger noise level than the higher order IMD, if the lower order IMD (such as IMD3) falls to the radio system frequency range, a larger A-MPR is needed as illustrated in FIG. 2. FIG. 2 illustrates the relationship between CBW and IMD3. The mixing in the power amplifier (PA) refers to the multiplication of the signal components.

This may be problematic, since most of the NR operating bands require additional spectrum emission requirements. Table 1 below shows the mapping of network signaling (NS) labels to NR frequency bands according to current specifications. It should be noted that Table 1 lists NS(s) for NR bands for single carrier operation, and NS_01 is a default NS that means no A-MPR is required under the network broadcasting NS_01. Similar tables are specified for uplink carrier aggregation (CA) and multi-RAT dual connectivity (MR-DC).

TABLE 1

| NR band | Value of additionalSpectrumEmission | | | | | | | |
|---|---|---|---|---|---|---|---|---|
| | 0 | 1 | 2 | 3 | 4 | 5 | 6 | 7 |
| n1 | NS_01 | NS_100 | NS_05 | NS_05U | NS_48 | NS_49 | | |
| n2 | NS_01 | NS_100 | NS_03 | NS_03U | | | | |
| n3 | NS_01 | NS_100 | | | | | | |
| n5 | NS_01 | NS_100 | | | | | | |
| n7 | NS_01 | NS_46 | | | | | | |
| n8 | NS_01 | NS_100 | NS_43 | NS_43U | | | | |
| n12 | NS_01 | NS_06 | | | | | | |
| n14 | NS_01 | NS_06 | | | | | | |
| n18 | NS_01 | NS_100 | | | | | | |
| n20 | NS_01 | Void | NS_10 | | | | | |
| n25 | NS_01 | NS_100 | NS_03 | NS_03U | | | | |
| n26 | NS_01 | NS_100 | NS_12 | NS_13 | NS_14 | NS_15 | | |
| n28 | NS_01 | NS_17 | NS_18 | | | | | |
| n30 | NS_01 | NS_21 | | | | | | |
| n34 | NS_01 | | | | | | | |
| n38 | NS_01 | NS_44 | | | | | | |
| n39 | NS_01 | NS_50 | | | | | | |

TABLE 1-continued

| NR band | Value of additionalSpectrumEmission | | | | | | | |
|---|---|---|---|---|---|---|---|---|
| | 0 | 1 | 2 | 3 | 4 | 5 | 6 | 7 |
| n40 | NS_01 | | | | | | | |
| n41 | NS_01 | NS_04 | NS_47 | | | | | |
| n48 | NS_01 | NS_27 | | | | | | |
| n50 | NS_01 | NS_41 | NS_42 | | | | | |
| n51 | NS_01 | NS_40 | | | | | | |
| n53 | NS_01 | NS_45 | | | | | | |
| n65 | NS_01 | NS_24 | NS_100 | NS_05 | NS_05U | NS_51 | | |
| n66 | NS_01 | NS_100 | NS_03 | NS_03U | | | | |
| n70 | NS_01 | NS_03 | | | | | | |
| n71 | NS_01 | NS_35 | | | | | | |
| n74 | NS_01 | NS_37 | NS_38 | NS_39 | | | | |
| n77 | NS_01 | | | | | | | |
| n78 | NS_01 | | | | | | | |
| n79 | NS_01 | | | | | | | |
| n80 | NS_01 | NS_100 | | | | | | |
| n81 | NS_01 | NS_100 | NS_43 | NS_43U | | | | |
| n82 | NS_01 | Void | | | | | | |
| n83 | NS_01 | NS_17 | NS_18 | | | | | |
| n84 | NS_01 | NS_100 | NS_05 | NS_05U | | | | |
| n86 | NS_01 | NS_100 | NS_03 | NS_03U | | | | |
| n89 | NS_01 | NS_100 | | | | | | |
| n91 | NS_01 | | | | | | | |
| n92 | NS_01 | | | | | | | |
| n93 | NS_01 | | | | | | | |
| n94 | NS_01 | | | | | | | |
| n95 | NS_01 | | | | | | | |

As can be seen from Table 1, 32 out of 43 NR bands have NS(s). As a more concrete example of the amount of A-MPR, A-MPR for 15 MHz CBW for NS_46 is up to 3.5 dB, while A-MPR for 30 MHz CBW for NS_46 is up to 11 dB in some conditions given for example by the position and width of RB allocation. This means that if the CBW doubles from 15 MHz to 30 MHz, then a 7.5 dB power reduction for uplink is additionally allowed. Hence, the network capacity does not linearly increase according to the size of CBW. In addition, uplink coverage would be reduced in some cases, since A-MPR is allowed for any physical layer channel including the control channel.

Intrinsic potential of the spectrum, such as network capacity per cell and network coverage per UE, may be lost, because the network cannot optimize its scheduler due to lack of information on each UE's actual A-MPR capability due to the following reasons.

The required A-MPR values are subject to various factors such as the number of RBs, its position in a frequency band, uplink DC location, etc. It is not practical to accommodate A-MPR for every single condition in the specification due to the workload and specification complexity. In addition, this causes more test burden. Thus, the current A-MPR requirements are basically based on per CBW per band, and each of the A-MPR evaluations has been performed in a way that the DC location is always at the center of the CBW for single carrier operation or of the aggregated CBWs for CA operation covered by one PA.

A-MPR values derived from these conditions, however, can be significantly conservative. A bandwidth part (BWP) width can be smaller than its CBW, and the DC location can be closer to the center of the BWP. In this case, the required amount of A-MPR is less than that of the specified A-MPR.

Since the network has to optimize its scheduler based on the specified A-MPR and its conditions, the network has to schedule RBs to UEs in a very pessimistic way such that the number of allocated RBs is limited more than necessary and/or a lower order modulation is selected. For example, the network may allocate a very limited number of RBs at a certain frequency position to a UE, if a larger number of RB allocation at the position requires a larger A-MPR based on the current specification. However, if the UE uses less A-MPR in reality, the network should allocate a larger number of RBs to the UE to complete its communication faster. As another example, in the same situation as the previous example, the network may select a lower order modulation such as QPSK unnecessarily, even though the network could use a higher order modulation such as 64-state quadrature amplitude modulation (64 QAM) instead. A higher order modulation may require higher A-MPR values than a lower order modulation does.

The amount of the required A-MPR value is subject to the distance between the outermost RB position and the uplink DC location. If the distance is larger, then the larger A-MPR may become in most cases, since it increases the possibility for the odd lower order IMD, such as IMD3, to reach the radio system frequency range as shown in FIG. 2.

Figure 3:
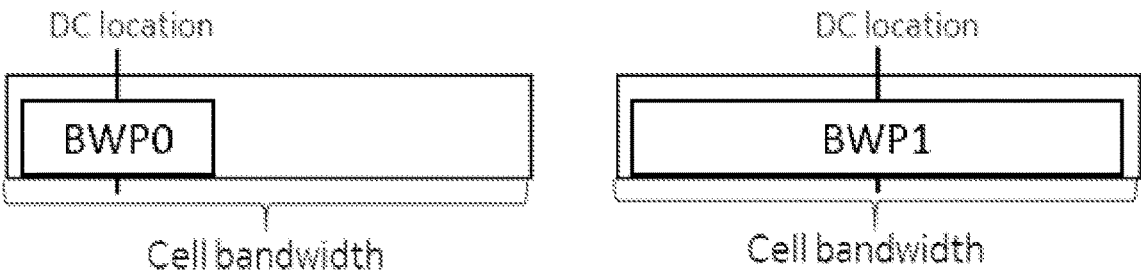
FIG. 3 illustrates per-bandwidth-part direct current location.

In reality, the DC location may vary depending on which uplink BWP is used. Unlike LTE, NR Rel-15 has defined UE reporting to network to indicate where the DC location is per BWP, as exemplified in FIG. 3. FIG. 3 illustrates per-BWP DC location. In FIG. 3, the DC location is in the middle of the BWPs denoted as BWP0 and BWP1.

Figure 4A:
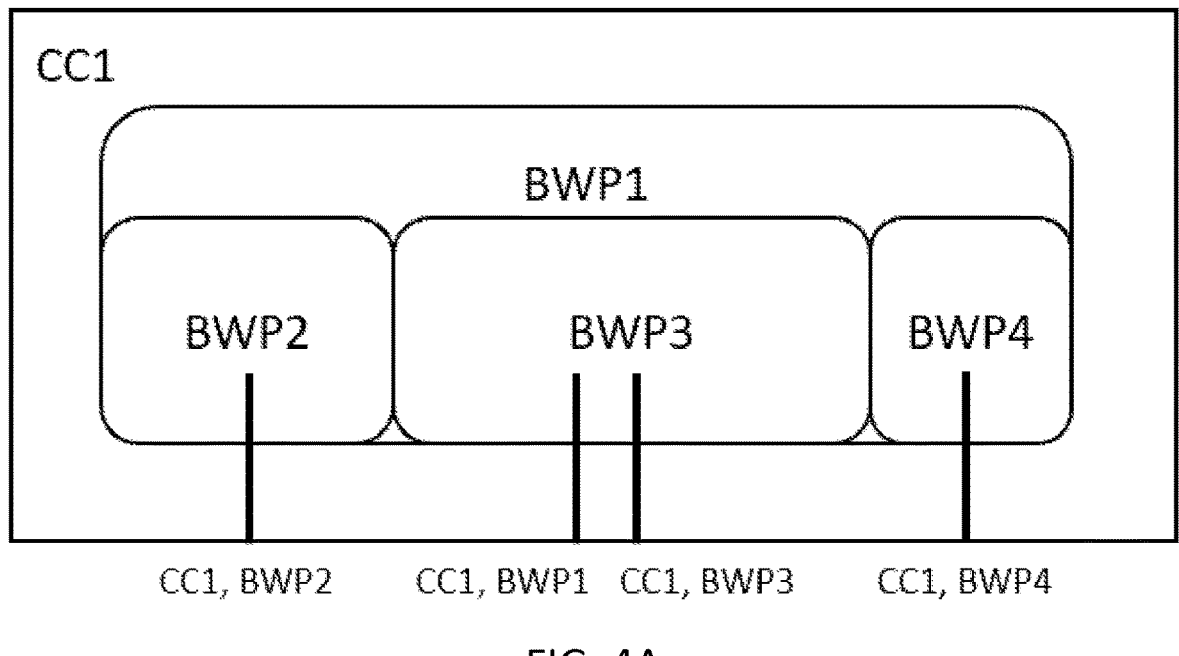
FIG. 4A illustrates a cell with four bandwidth parts in a first component carrier using a different direct current location for each of the four BWPs.
Figure 4B:
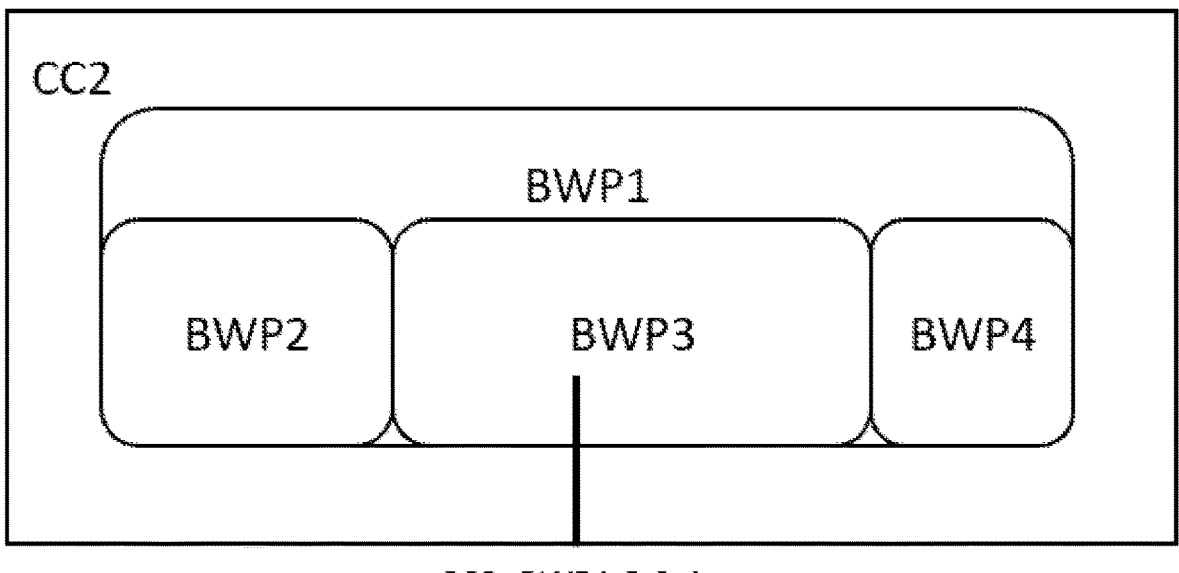
FIG. 4B illustrates a cell with four bandwidth parts in a second component carrier using the same direct current location for all of the four BWPs.

However, the UE is not required to report a specific DC location, such as the center of the usable frequency, for a given BWP. Instead, the UE can report any DC location it wishes. For example, the UE may use the center frequency of each BWP (see FIG. 4A), or it may choose to indicate the same DC location for all BWPs (see FIG. 4B). The UE may even indicate an "outside carrier" or "unknown" DC location. FIG. 4A illustrates a cell with four BWPs (BWP1, BWP2, BWP3, BWP4) in a first component carrier (CC1) using a different DC location for each of the four BWPs. FIG. 4B illustrates a cell with four BWPs (BWP1, BWP2, BWP3, BWP4) in a second component carrier (CC2) using the same DC location for all of the four BWPs.

With this mechanism, the network can know the exact DC location being used by the UE, unless the UE indicates an "outside carrier" or "unknown" DC location. As mentioned previously, there is a possibility that the required A-MPR is less than what is specified in the 3GPP specification. For example, the required A-MPR for BWP2 in CC1 in FIG. 4A may be less than for BWP2 in CC2 in FIG. 4B. This is because the distance between the edges of the BWP and the DC location for BWP2 in CC1 is smaller than that in CC2. Therefore, an odd lower order IMD from BWP2 in CC1 does not reach as far as from BWP2 in CC2. Thus, for NR, the network has a possibility via DC location reporting to know that the amount of A-MPR used by the UE may be less than the specified A-MPR.

Figure 5:
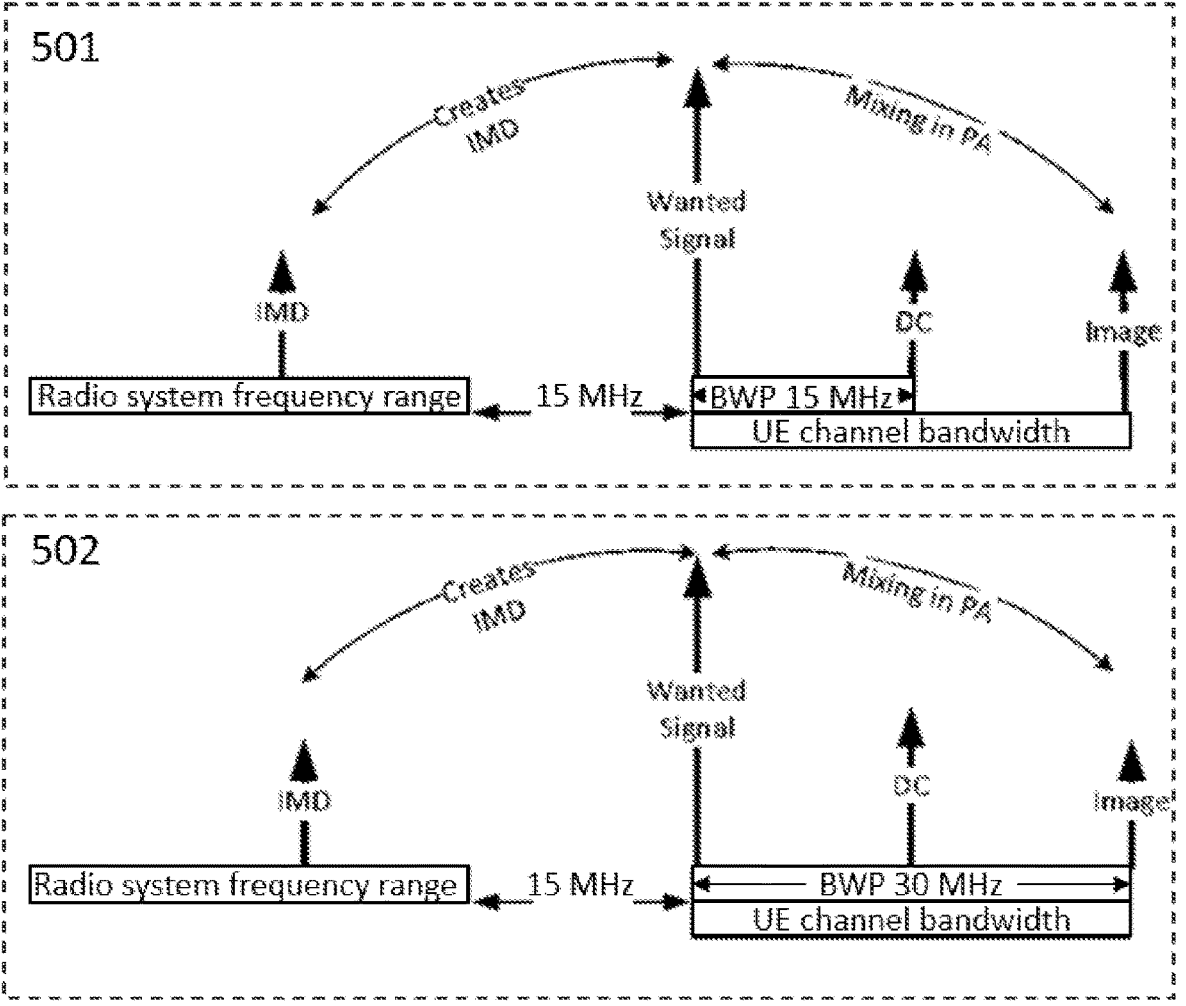
FIG. 5 illustrates the current way of defining additional maximum power reduction.

However, so far A-MPR evaluations have been performed on a per CBW basis under the assumption that the DC location is always at the center of the CBW as depicted in FIG. 5. Therefore, currently UEs use an A-MPR defined on a CBW basis no matter what the active BWP or DC location is. FIG. 5 illustrates the current way of defining A-MPR. In both the upper case 501 and the bottom case 502 of FIG. 5, the IMD hits the radio system frequency range, and thus A-MPR is needed.

Figure 6:
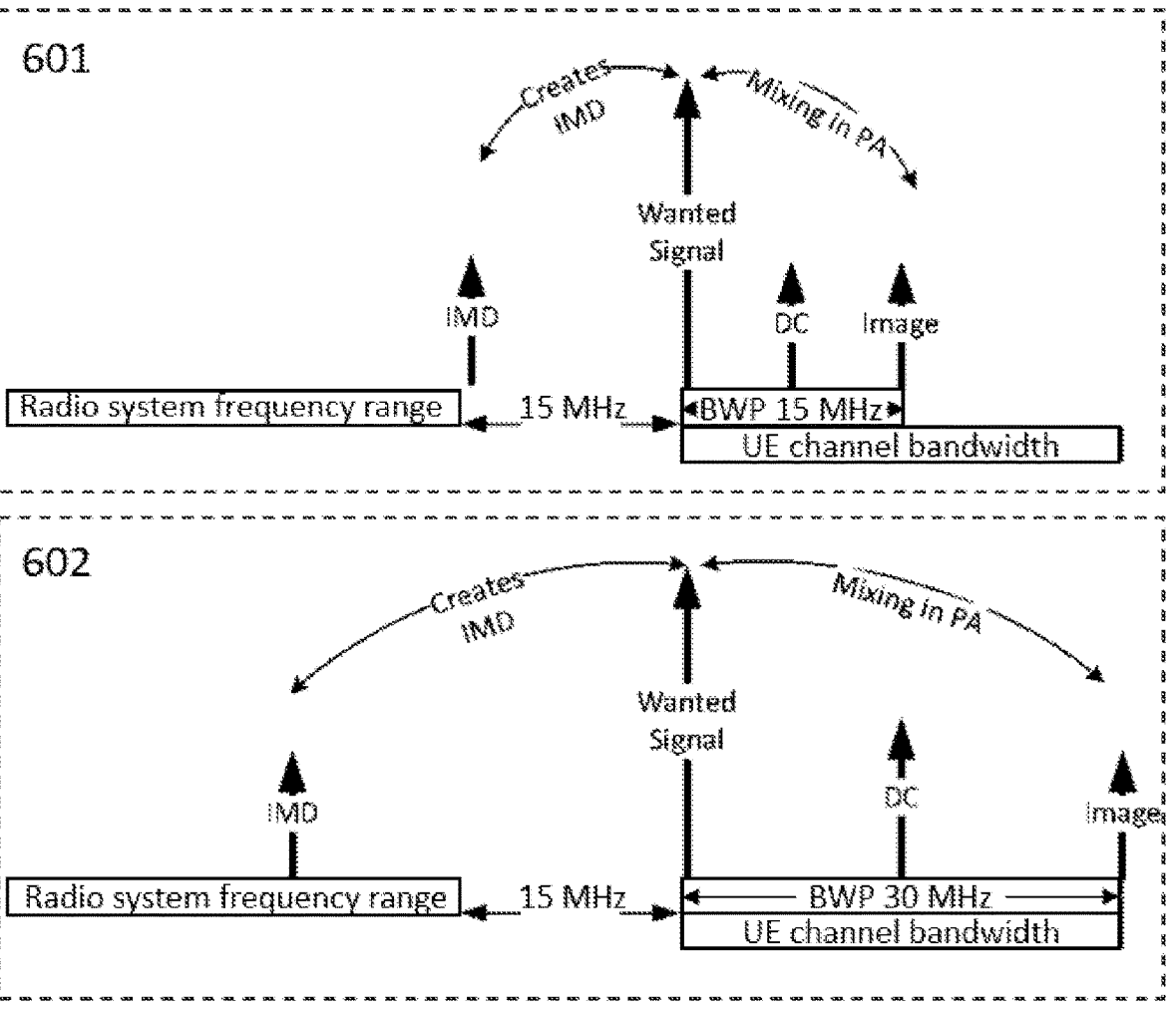
FIG. 6 illustrates a way for defining additional maximum power reduction, if the direct current location is known.

But, if A-MPR would be determined on a BWP basis (not CBW basis) taking into account the signalled DC location, then A-MPR could be determined as in FIG. 6. FIG. 6 illustrates a way for defining A-MPR, if the DC location is known. In the FIG. 6 upper case 601, IMD does not hit the radio system frequency range, and thus A-MPR is not needed or is smaller. In the FIG. 6 bottom case 602, IMD hits the radio system frequency range, and thus A-MPR is needed. Now, looking at the upper case 601 of FIG. 6, it can be observed that A-MPR is smaller compared to the FIG. 5 upper case 501, even though both cases have exactly the same BWP allocation within the CBW. The difference is just the DC location.

Both 15 MHz BWP cases 501, 601 in FIGS. 5 and 6 are valid UE behaviours, and if the UE reports a DC location as in FIG. 5, then the A-MPR is defined as today. But, if the UE reports a DC location as the case 601 in FIG. 6, then there is potential to significantly reduce the A-MPR. However, this A-MPR reduction potential may not manifest unless specifications mandate to use a different A-MPR based on a mutual relation of the DC location and the active BWP, as otherwise the UE may still use the specified A-MPR as much as possible by reducing power amplifier linearity to minimize its power consumption. As a consequence, the network has to schedule its network resources to UEs in a very pessimistic way such that the number of allocated RBs is limited more than necessary and/or a lower order modulation is selected. It means that the network cannot make use of all of its intrinsic resource potential for the UEs.

Some exemplary embodiments may be used to obtain adjusted A-MPR information combined with UE capability reporting. UEs reporting the adjusted A-MPR capability may adjust A-MPR according to one or more pre-defined rules, and/or report their DC location to the base station in order to allow the base station to identify the adjusted A-MPR. For example, adjusting the A-MPR may comprise determining and/or adjusting the amount of A-MPR. Thus, the UE may be configured to determine an amount of adjusted A-MPR. The base station can identify the adjusted A-MPR to be used or being used by the UEs, as well as conditions for applying this adjusted A-MPR, such as the number of RBs, the position of the RBs, and/or the center frequency range. The identification may be done by determining the distance between the DC location and the edge of the uplink BWP being used or to be used.

Some examples of the one or more pre-defined rules for adjusting the A-MPR is presented in the following with reference to FIGS. 7-9.

Figure 7:
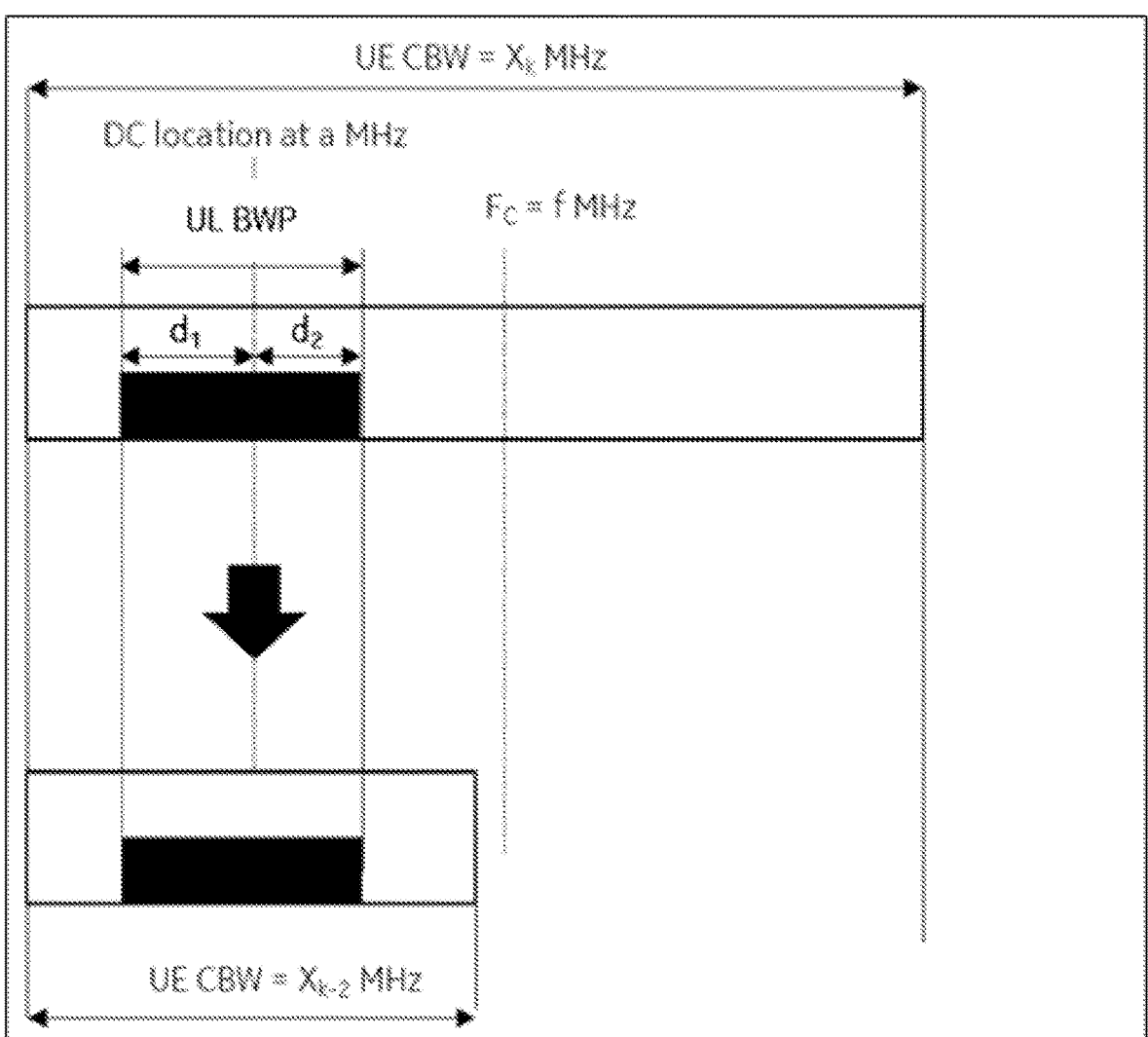
FIG. 7-9 illustrate example cases according to some exemplary embodiments.

FIG. 7 illustrates an example case 700 according to an exemplary embodiment, wherein A-MPR for UE CBW of $X_k$ MHz is replaced with that for UE CBW of $X_{k-2}$ MHz. A UE supporting CBWs of $X_1, \ldots, X_m$ is camping on a cell with $X_k$ MHz CBW as illustrated in FIG. 7. Note that $1 < K \leq m$. The one or more pre-defined rules cause an apparatus such as a UE and/or a base station to perform the steps described in the following. First, the larger one ($d_1$) of the distances $d_1$, $d_2$ between the DC location and the edges of the BWP is selected and multiplied by two, i.e. $2*\max(d_1, d_2)=2*d_1$. Then, CBWs greater than or equal to $2*d_1$ (i.e. $\geq 2*d_1$ or $> 2*d_1$) are identified. For example, suppose that $X_k$, $X_{k-1}$, and $X_{k-2} \geq 2*d_1$. The smallest ($X_{k-2}$) of these identified CBWs is then selected, i.e. $\min(X_k, X_{k-1}, X_{k-2})= X_{k-2}$. If $X_{k-2}$ is confined within the band, then A-MPR is applied for the CBW of $X_k$-2 MHz whose center frequency is a MHz (i.e. the DC location), instead of applying A-MPR for the CBW of Xx MHz whose center frequency $F_c=f$ MHz. In other words, the amount of adjusted A-MPR is determined based on the smallest CBW (i.e. $X_{k-2}$) of the identified CBWs.

Figure 8:
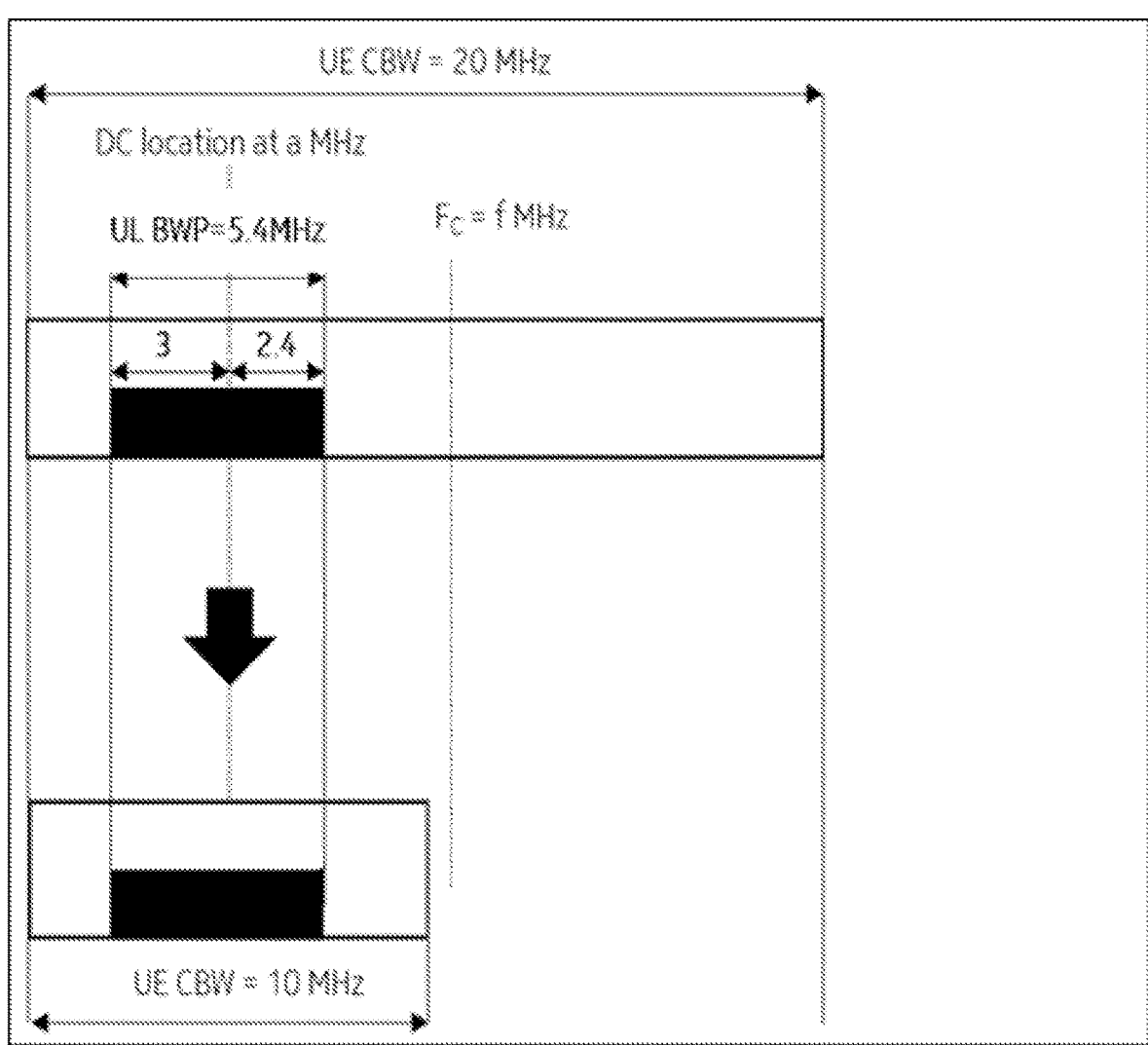

FIG. 8 illustrates another example case 800 according to an exemplary embodiment, wherein A-MPR for UE CBW of 20 MHz is replaced with that for UE-CBW of 10 MHz. An NR band supports 5, 10, 15, and 20 MHz CBW, and the UE is camping on a cell with 20 MHz CBW. The one or more pre-defined rules cause an apparatus such as a UE and/or a base station to perform the steps described in the following. The larger one ($d_1=3$ MHZ) of the distances $d_1$, $d_2$ between the DC location and the edges of the BWP is selected and multiplied by two, i.e $2*\max(d_1, d_2)=2*\max(3$ MHz, 2.4 MHz)$=2*3$ MHZ$=6$ MHz. CBWs greater than or equal to 6 MHz are then identified. The identified CBWs are 10, 15, and 20 MHz. The smallest of the identified CBWs, i.e. 10 MHZ, is selected. The 10 MHz CBW is confined within the band. A-MPR is applied for the CBW of 10 MHz whose center frequency is a MHz (i.e. the DC location), instead of applying A-MPR for the CBW of 20 MHz whose center frequency $F_c=f$ MHz. In other words, the amount of adjusted A-MPR is determined based on the 10 MHz CBW.

As explained with the example of NS_46 of Table 1, applying A-MPR for a narrower CBW can enable using a significantly higher UE output power, thus enabling greater uplink throughput by having wider physical resource block (PRB) allocations and higher modulation available. The higher output power may also extend the cell coverage.

Figure 9:
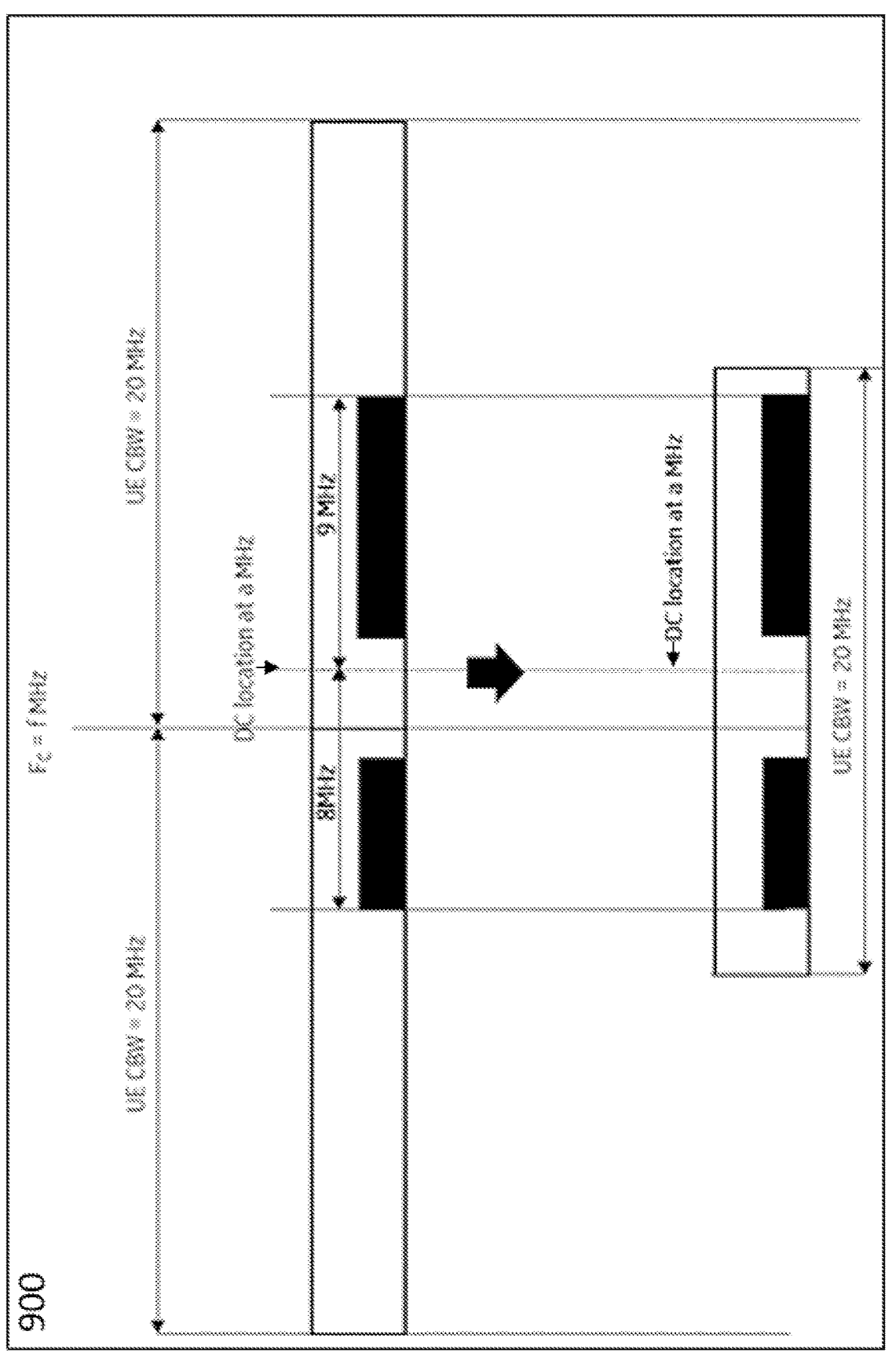

Moreover, some exemplary embodiments may be applicable to uplink CA, for example intra-band contiguous, intra-band non-contiguous uplink CA, as well as E-UTRAN new radio dual connectivity (EN-DC) or MR-DC, such as intra-band contiguous EN-DC, where $d_1$ is replaced with the distance between the lower edge of the lowest uplink BWP among the configured CCs, and $d_2$ is replaced with the distance between the higher edge of the highest UL BWP among the configured CCs, as illustrated in FIG. 9.

FIG. 9 illustrates another example case 900 according to an exemplary embodiment, wherein A-MPR for UE CBW of 40 MHz is replaced with that for UE CBW of 20 MHz. The one or more pre-defined rules cause an apparatus such as a UE and/or a base station to perform the steps described in the following. The distance (9 MHz) between the DC location and the higher edge of the highest BWP is selected and multiplied by two, i.e $2*\max(d_1, d_2)=2*\max(8\ \text{MHz}, 9\ \text{MHz})=2*9\ \text{MHZ}=18\ \text{MHz}$. CBWs greater than or equal to 18 MHz are then identified. The identified CBWs are 20, 30, and 40 MHz. The smallest of the identified CBWs, i.e. 20 MHz, is selected. The 20 MHz CBW is confined within the band. A-MPR is applied for the CBW of 20 MHz whose center frequency is a MHz (i.e. the DC location), instead of applying A-MPR for the CBW of 40 MHz whose center frequency $F_c=f$ MHz. In other words, the amount of adjusted A-MPR is determined based on the 20 MHz CBW.

The UE capability for indicating support for the adjusted A-MPR may be defined in at least one level to indicate how the UE supports the operation in different cases. The UE capability may be defined per band for single-band operation and per band combination (BC) for intra-band uplink CA or intra-band EN-DC or MR-DC. For example, the following two ways may be used for adjusting the A-MPR.

The first way is that UEs with this capability are configured to always adjust A-MPR according to the one or more pre-defined rules. It should be noted that there is no compatibility problem for legacy networks, since only the A-MPR is affected, and thus the network not knowing the adjusted A-MPR may cause scheduling inefficiency but no inter-operability problems.

The second way is that UEs with this capability are configured to inform the base station about applying the adjusted A-MPR together with a DC location report. The informing may be performed upon the base station requesting the information, or without an explicit request from the base station. This leaves some implementation flexibility to UE designs. For example, the UE may not always be able to adjust its A-MPR in the same way in all band combinations due to temporary conditions, such as overheating.

Example signalling for reporting the UE capability for different capability possibilities are presented in the following.

Per-band capability (i.e. UE indicating supported bands for the feature, independent of BC) may be reported for example as follows:

```
BandNR :: =               SEQUENCE {
    bandNR                FreqBandIndicatorNR,
    ...,
--<UNNECESSARY PARTS OMITTED>
    [[
    adjustedA-MPR-r17     ENUMERATED {supported}  OPTIONAL
    ]]
```

Per-BC and per-band-per-BC capability (i.e. UE indicating support for each band of each BC) may be reported for example as follows:

```
RF-Parameters ::=                    SEQUENCE {
    supportedBandListNR              SEQUENCE (SIZE
(1..maxBands)) OF BandNR,
    supportedBandCombinationList
BandCombinationList                  OPTIONAL,
    appliedFreqBandListFilter        FreqBandList
OPTIONAL,
--<UNNECESSARY PARTS OMITTED>
    ...,
--<UNNECESSARY PARTS OMITTED>
    [[
    supportedBandCombinationList-v17xy
BandCombinationList-v17xy            OPTIONAL
    ]]
}
BandCombinationList-v17xy ::=        SEQUENCE (SIZE (1..maxBandComb)) OF
BandCombination-v17xy
```

The DC location, including the optional network request for the A-MPR adjustment, may be signalled for example as follows:

```
BandCombination-v17xy ::=     SEQUENCE {
    adjustedA-MPR-r17         ENUMERATED {supported}  OPTIONAL
}
```

Per-band-per-BC capability may be reported for example as follows:

```
BandCombination-v17xy ::=     SEQUENCE {
    bandList-v17xy            SEQUENCE (SIZE
(1..maxSimultaneousBands)) OF BandParameters-v17xy
}
BandParameters-v17xy ::=      SEQUENCE {
    adjustedA-MPR-r17             ENUMERATED {supported}  OPTIONAL
}
```

The DC location, including the optional network request for the A-MPR adjustment, may be signalled for example as follows:

```
-- Configuration of one Cell-Group:
CellGroupConfig ::=                    SEQUENCE {
    cellGroupId                            CellGroupId,
    rlc-BearerToAddModList                    SEQUENCE (SIZE(1..maxLC-
ID)) OF RLC-BearerConfig                   OPTIONAL,  -- Need N
    rlc-BearerToReleaseList                   SEQUENCE (SIZE(1..maxLC-
ID)) OF LogicalChannelIdentity               OPTIONAL,  -- Need N
    mac-CellGroupConfig                    MAC-CellGroupConfig
OPTIONAL,  -- Need M
    physicalCellGroupConfig                PhysicalCellGroupConfig
OPTIONAL,  -- Need M
    spCellConfig                           SpCellConfig
OPTIONAL,  -- Need M
    sCellToAddModList                      SEQUENCE (SIZE
(1..maxNrofSCells)) OF SCellConfig             OPTIONAL,  --
Need N
    sCellToReleaseList                     SEQUENCE (SIZE
(1..maxNrofSCells)) OF SCellIndex              OPTIONAL,  --
Need N
    ...,
--<UNNECESSARY PARTS OMITTED>
    [[
    reportAdjustedSpectrumEmission-r17         ENUMERATED {true}
OPTIONAL    -- Need N
    ]]
}
```

In the following example, the UE indicates whether or not it applies the adjusted A-MPR when using the uplink BWP:

```
UplinkTxDirectCurrentList :: =         SEQUENCE (SIZE
(1..maxNrofServingCells)) OF UplinkTxDirectCurrentCell
UplinkTxDirectCurrentCell ::=          SEQUENCE {
    servCellIndex                          ServCellIndex,
    uplinkDirectCurrentBWP                 SEQUENCE (SIZE
(1..maxNrofBWPs)) OF UplinkTxDirectCurrentBWP,
    ...,
    [[
    uplinkDirectCurrentBWP-SUL             SEQUENCE (SIZE
(1..maxNrofBWPs)) OF UplinkTxDirectCurrentBWP    OPTIONAL
    ]],
    [[
    adjustedSpectrumEmission-r17           ENUMERATED {true}
OPTIONAL
    ]]
}
UplinkTxDirectCurrentBWP :: =          SEQUENCE {
    bwp-Id                                 BWP-Id,
    shift7dot5kHz                          BOOLEAN,
    txDirectCurrentLocation                INTEGER (0..3301)
}
```

Table 2 below includes the UplinkTxDirectCurrentCell field descriptions.

TABLE 2

| UplinkTxDirectCurrentCell field descriptions | |
| --- | --- |
| adjustedSpectrumEmission | Indicates whether UE applies A-MPR adjustment when using this UL BWP. |
| servCellIndex | The serving cell identifier of the serving cell corresponding to the uplinkDirectCurrentBWP. |
| uplinkDirectCurrentBWP | The TX DC locations for all the uplink BWPs configured at the corresponding serving cell. |
| uplinkDirectCurrentBWP-SUL | The TX DC locations for all the supplementary uplink BWPs configured at the corresponding serving cell. |

Figure 10:
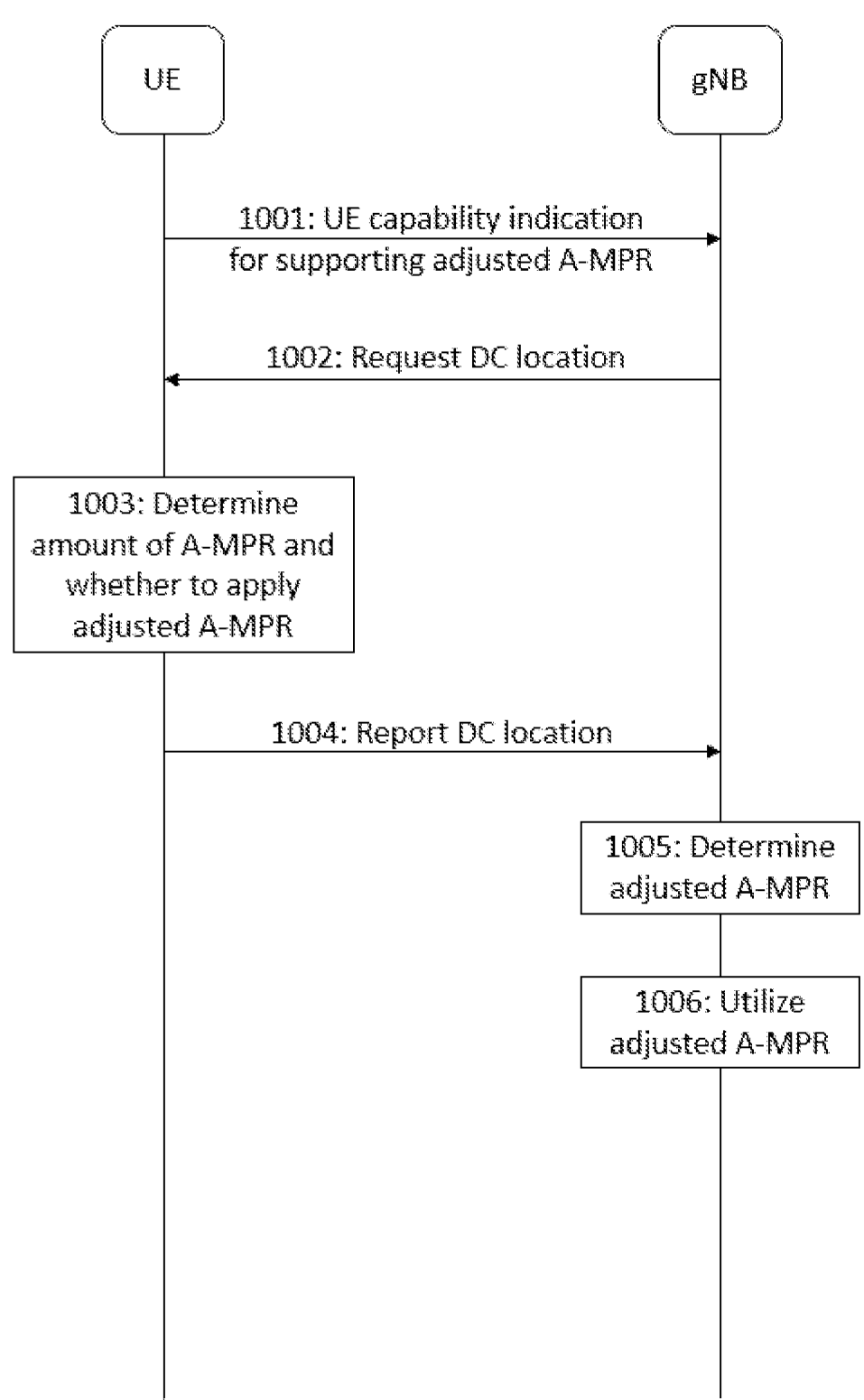
FIGS. 10-12 illustrate signaling diagrams according to some exemplary embodiments.

FIG. 10 illustrates a signalling diagram according to an exemplary embodiment. In this exemplary embodiment, a UE indicates whether it supports adjusted A-MPR as part of UE capabilities, and the network knows that the UE always applies A-MPR to one or more bands or band combinations (BCs) based on where the DC location of the UE is. Hence, the network determines the adjusted A-MPR based on the capability indication and the DC location.

Referring to FIG. 10, the UE transmits 1001 a capability indication to a base station such as a gNB, wherein the capability indication indicates whether the UE supports adjusted A-MPR for one or more BCs. The base station transmits 1002 a message, for example an RRC reconfiguration message, to the UE requesting the UE to report the DC location of the UE to the base station. The UE determines 1003 the A-MPR to be used, as well as whether to apply adjusted A-MPR, based on the used BC. If the UE decides to apply adjusted A-MPR, then the amount of adjusted A-MPR may be determined according to one or more pre-defined rules based on the DC location, for example as described previously with reference to FIGS. 7-9. The UE transmits 1004 a message, for example an RRC reconfiguration complete message, to the base station, wherein the message comprises the requested DC location report. The base station determines 1005 the amount of adjusted A-MPR based on the UE capability indication 1001 and the DC location report 1004 according to the one or more pre-defined rules. The base station utilizes the determined adjusted A-MPR in uplink power control for the UE. For example, the base station may transmit a message to the UE for adjusting the transmit power of the UE based on the adjusted A-MPR for example via power control commands for a physical uplink control channel (PUCCH) and/or a physical uplink shared channel (PUSCH).

Figure 11:
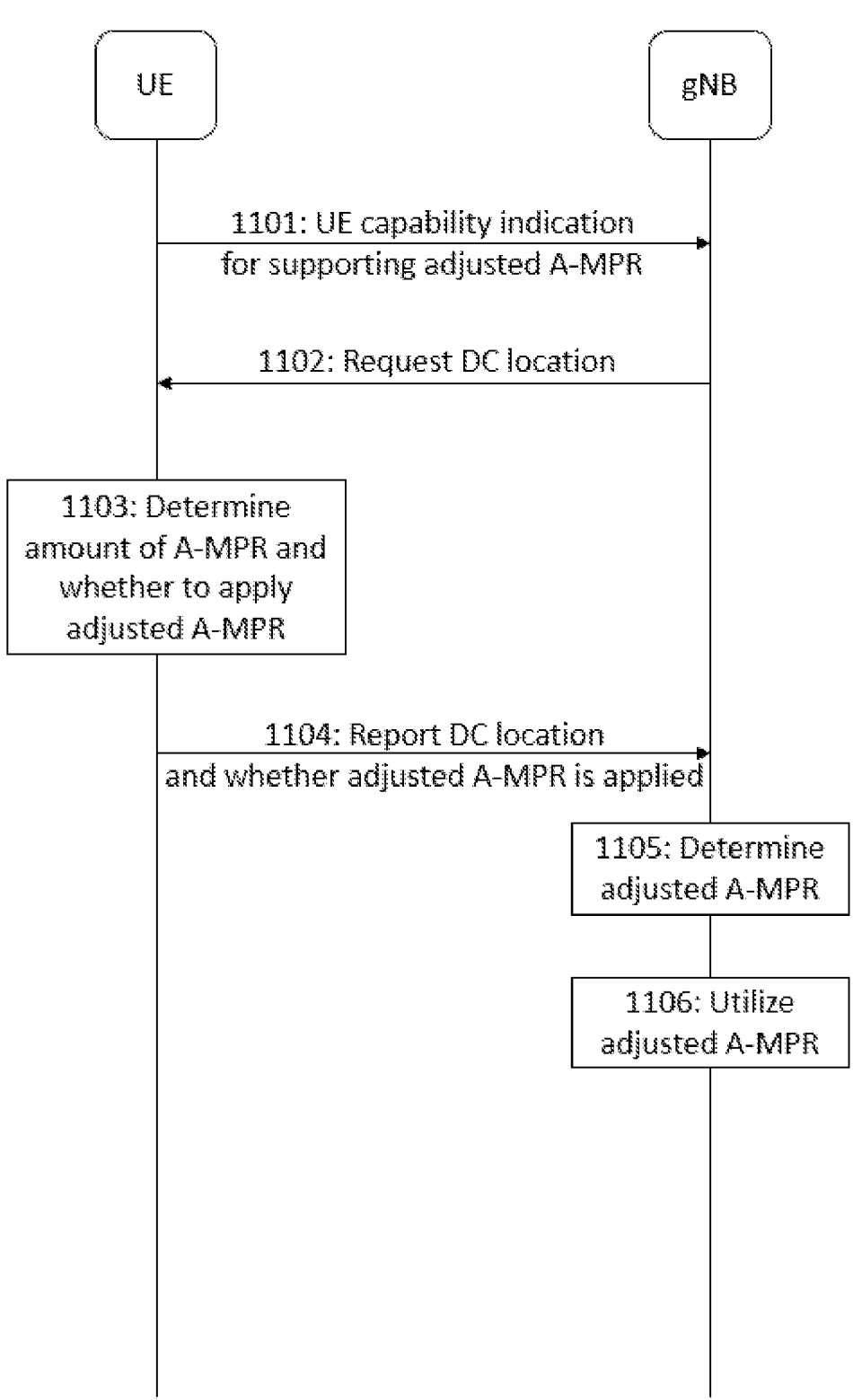

FIG. 11 illustrates a signalling diagram according to another exemplary embodiment. In this exemplary embodiment, the UE explicitly indicates in the DC location report whether it applies adjusted A-MPR or not. In other words, the UE may not always apply the adjusted A-MPR, depending on circumstances. Hence, the network determines the adjusted A-MPR, and whether the UE applies the adjusted A-MPR, based on the capability indication, the DC location, and the indication indicating whether the UE applies the adjusted A-MPR or not.

Referring to FIG. 11, the UE transmits 1101 a capability indication to a base station such as a gNB, wherein the capability indication indicates whether the UE supports adjusted A-MPR for one or more BCs. The base station transmits 1102 a message, for example an RRC reconfiguration message, to the UE requesting the UE to report the DC location of the UE to the base station. The UE determines 1103 the A-MPR to be used, as well as whether to apply adjusted A-MPR, based on the used BC. If the UE decides to apply adjusted A-MPR, then the amount of adjusted A-MPR may be determined according to one or more pre-defined rules based on the DC location, for example as described previously with reference to FIGS. 7-9. The UE transmits 1104 a message, for example an RRC reconfiguration complete message, to the base station, wherein the message comprises the requested DC location report as well as an indication indicating whether or not adjusted A-MPR is applied. The base station determines 1105 the adjusted A-MPR based on the UE capability indication 1101 and the DC location report 1104 comprising the DC location and the indication on whether the UE applies adjusted A-MPR or not. The base station utilizes the determined adjusted A-MPR in uplink power control for the UE, if the UE indicates that it applies the adjusted A-MPR.

Figure 12:
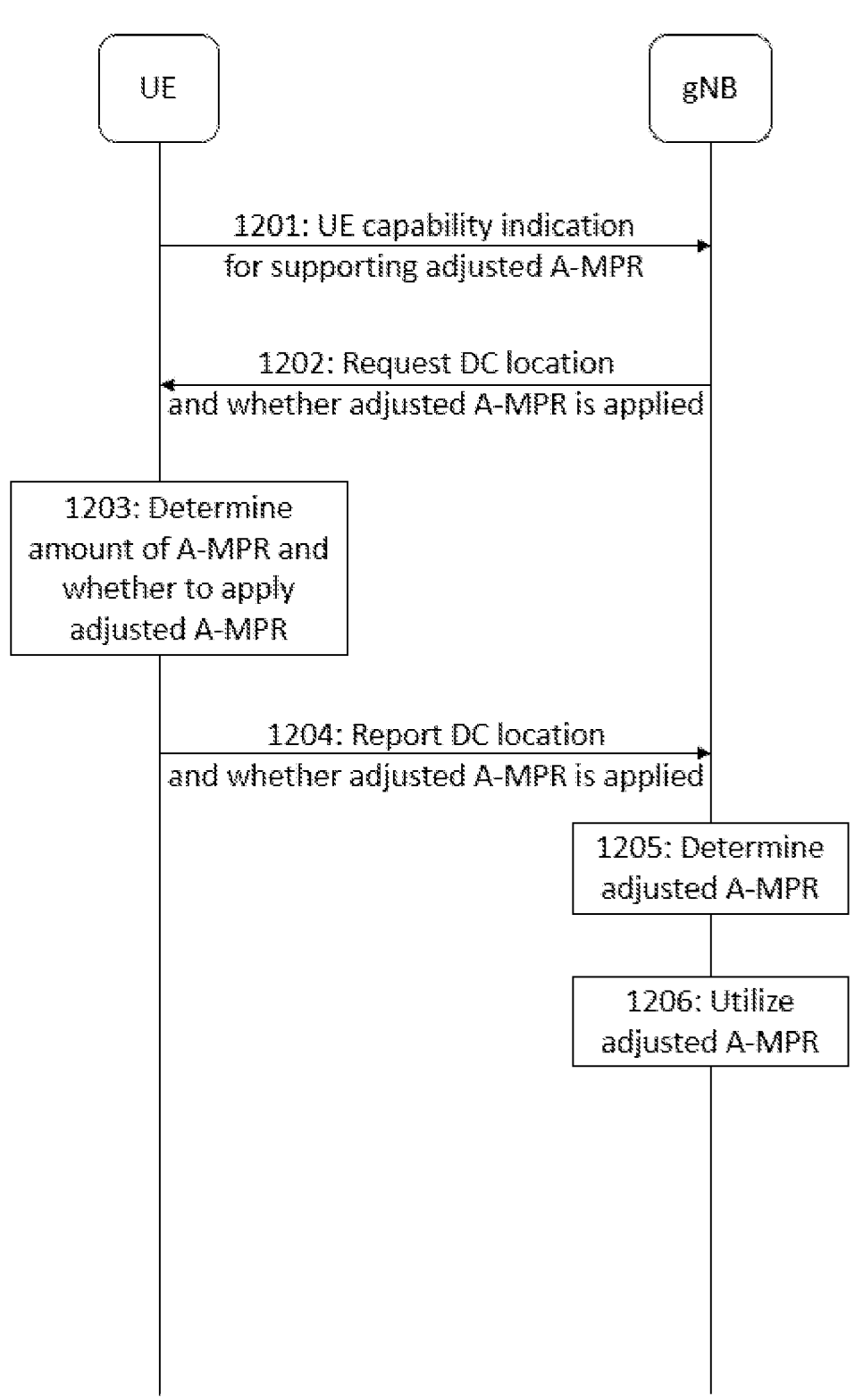

FIG. 12 illustrates a signalling diagram according to another exemplary embodiment. In this exemplary embodiment, the UE indicates in the DC location report whether it applies the adjusted A-MPR based on a network request. In other words, the UE may not always apply the adjusted A-MPR depending on circumstances, and regardless of whether the UE applies the adjusted A-MPR, the indication on whether A-MPR is applied is transmitted to the network only if the network requests it. Hence, the network determines the adjusted A-MPR, and whether the UE applies the adjusted A-MPR, based on the capability indication, the DC location, and the indication of adjusted A-MPR usage within the DC location report. This exemplary embodiment may keep legacy network functionality intact without increasing signalling size.

Referring to FIG. 12, the UE transmits 1201 a capability indication to a base station such as a gNB, wherein the capability indication indicates whether the UE supports adjusted A-MPR for one or more BCs. The base station transmits 1202 a message, for example an RRC reconfiguration message, to the UE requesting the UE to report the DC location of the UE as well as whether or not the UE applies adjusted A-MPR. The UE determines 1203 the A-MPR to be used, as well as whether to apply adjusted A-MPR, based on the used BC. If the UE decides to apply adjusted A-MPR, then the amount of adjusted A-MPR may be determined according to one or more pre-defined rules based on the DC location, for example as described previously with reference to FIGS. 7-9. The UE transmits 1204 a message, for example an RRC reconfiguration complete message, to the base station, wherein the message comprises the requested DC location report as well as an indication indicating whether or not adjusted A-MPR is applied. The base station determines 1205 the adjusted A-MPR based on the UE capability indication 1201 and the DC location report 1204 comprising the DC location and the indication on whether the UE applies adjusted A-MPR or not. The base station utilizes the determined adjusted A-MPR in uplink power control for the UE, if the UE indicates that it applies the adjusted A-MPR.

Figures 13, 14:
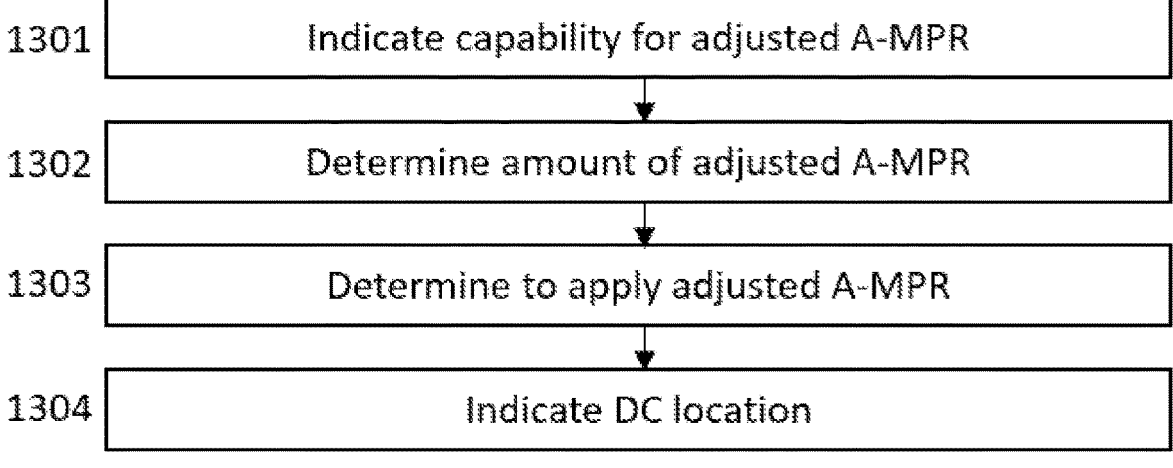
FIGS. 13-14 illustrate flow charts according to some exemplary embodiments.

FIG. 13 illustrates a flow chart according to an exemplary embodiment. The functions illustrated in FIG. 13 may be performed by an apparatus such as, or comprised, a UE. An adjusted A-MPR capability, i.e. a capability for applying an adjusted A-MPR, is indicated 1301 to a network element of a wireless communication network by transmitting a first message. The capability means that the apparatus is capable of following one or more pre-defined rules for example as described above with reference to FIGS. 7-9. The network element may be, for example, a base station such as a gNB. The first message may be transmitted to the network element or to some other network element of the wireless communication network. An amount of the adjusted A-MPR is determined 1302 according to the one or more pre-defined rules based at least partly on a DC location. In other words, if the relation between the DC location and BWP meets a certain condition according to the one or more pre-defined rules, the apparatus shall use the amount of adjusted A-MPR determined for the optimized (i.e. smaller) CBW, instead of the amount of A-MPR defined for the original CBW used by the apparatus. The apparatus determines 1303 to apply the adjusted A-MPR with the determined amount. A second message comprising at least an indication of the DC location is transmitted 1304 to the network element.

FIG. 14 illustrates a flow chart according to an exemplary embodiment. The functions illustrated in FIG. 14 may be performed by an apparatus such as, or comprised, a network element such as a base station (for example a gNB). Information indicating a capability of a UE for applying an adjusted A-MPR is obtained 1401. The information may be obtained by receiving the information from the UE or from another network element, to which the UE has reported the information. A message comprising at least an indication of a DC location associated with the UE is received 1402. An amount of the adjusted A-MPR associated with the UE is determined 1403 according to one or more pre-defined rules based at least partly on the DC location. The network element may then schedule resources accordingly.

The functions and/or blocks described above by means of FIGS. 10-14 are in no absolute chronological order, and some of them may be performed simultaneously or in an order differing from the described one. Other functions and/or blocks may also be executed between them or within them.

A technical advantage provided by some exemplary embodiments is that they enable a UE to decrease the A-MPR by applying a more suitable (adjusted) A-MPR using an A-MPR defined for a narrower CBW that is identified based on the distance between the DC location and the edges of the uplink BWP that is used. Based on the DC location indicated by the UE, the network is able to identify the adjusted maximum amount of A-MPR that can be applied by the UE, and thus resource usage may become more efficient. In other words, some exemplary embodiments may prevent unnecessary uplink power reduction, and enable the network to schedule radio resources for UEs more efficiently. Moreover, some exemplary embodiments allow the UE to select the TX DC location more accurately with respect to the BWP (and not CBW).

Figure 15:
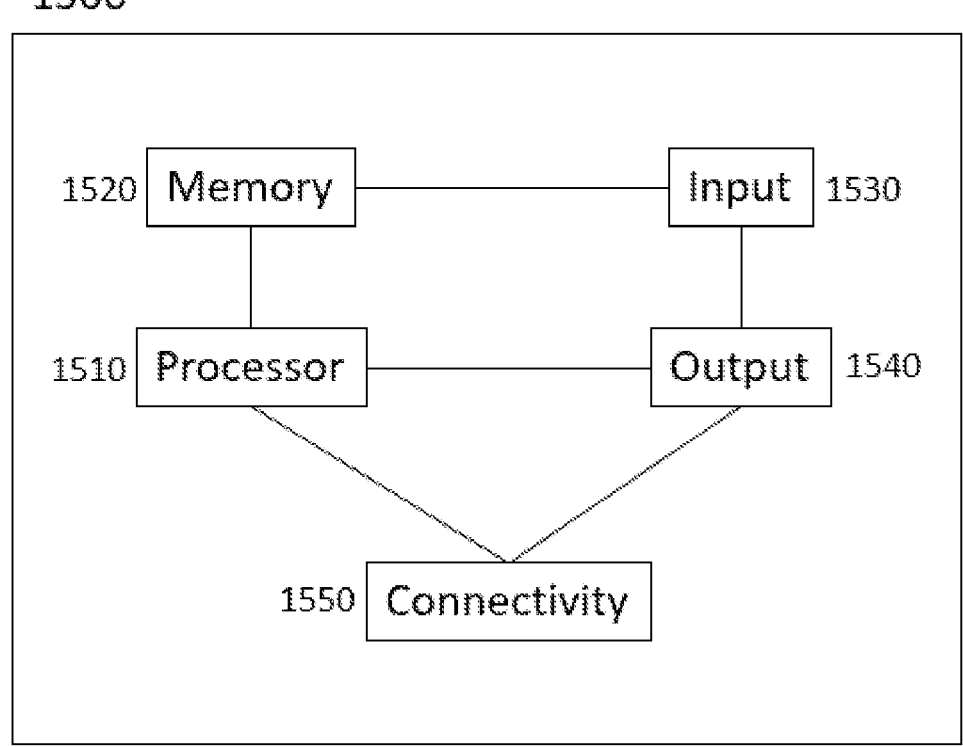
FIGS. 15-16 illustrate apparatuses according to some exemplary embodiments.

FIG. 15 illustrates an apparatus 1500, which may be an apparatus such as, or comprised in, a terminal device, according to an exemplary embodiment. A terminal device may also be referred to as a UE or user equipment herein. The apparatus 1500 comprises a processor 1510. The processor 1510 interprets computer program instructions and processes data. The processor 1510 may comprise one or more programmable processors. The processor 1510 may comprise programmable hardware with embedded firmware and may, alternatively or additionally, comprise one or more application-specific integrated circuits (ASICs).

The processor 1510 is coupled to a memory 1520. The processor is configured to read and write data to and from the memory 1520. The memory 1520 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EE-PROM), flash memory, optical storage or magnetic storage. In general, memories may be referred to as non-transitory computer readable media. The memory 1520 stores computer readable instructions that are executed by the processor 1510. For example, non-volatile memory stores the computer readable instructions and the processor 1510 executes the instructions using volatile memory for temporary storage of data and/or instructions.

The computer readable instructions may have been pre-stored to the memory 1520 or, alternatively or additionally, they may be received, by the apparatus, via an electromagnetic carrier signal and/or may be copied from a physical entity such as a computer program product. Execution of the computer readable instructions causes the apparatus 1500 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1500 may further comprise, or be connected to, an input unit 1530. The input unit 1530 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1530 may comprise an interface to which external devices may connect to.

The apparatus 1500 may also comprise an output unit 1540. The output unit may comprise or be connected to one or more displays capable of rendering visual content, such as a light emitting diode (LED) display, a liquid crystal display (LCD) and/or a liquid crystal on silicon (LCoS) display. The output unit 1540 may further comprise one or more audio outputs. The one or more audio outputs may be for example loudspeakers.

The apparatus 1500 further comprises a connectivity unit 1550. The connectivity unit 1550 enables wireless connectivity to one or more external devices. The connectivity unit 1550 comprises at least one transmitter and at least one receiver that may be integrated to the apparatus 1500 or that the apparatus 1500 may be connected to. The at least one transmitter comprises at least one transmission antenna, and the at least one receiver comprises at least one receiving antenna. The connectivity unit 1550 may comprise an integrated circuit or a set of integrated circuits that provide the wireless communication capability for the apparatus 1500.

Alternatively, the wireless connectivity may be a hardwired application-specific integrated circuit (ASIC). The connectivity unit 1550 may comprise one or more components such as a power amplifier, digital front end (DFE), analog-to-digital converter (ADC), digital-to-analog converter (DAC), frequency converter, (de)modulator, and/or encoder/decoder circuitries, controlled by the corresponding controlling units.

It is to be noted that the apparatus 1500 may further comprise various components not illustrated in FIG. 15. The various components may be hardware components and/or software components.

Figure 16:
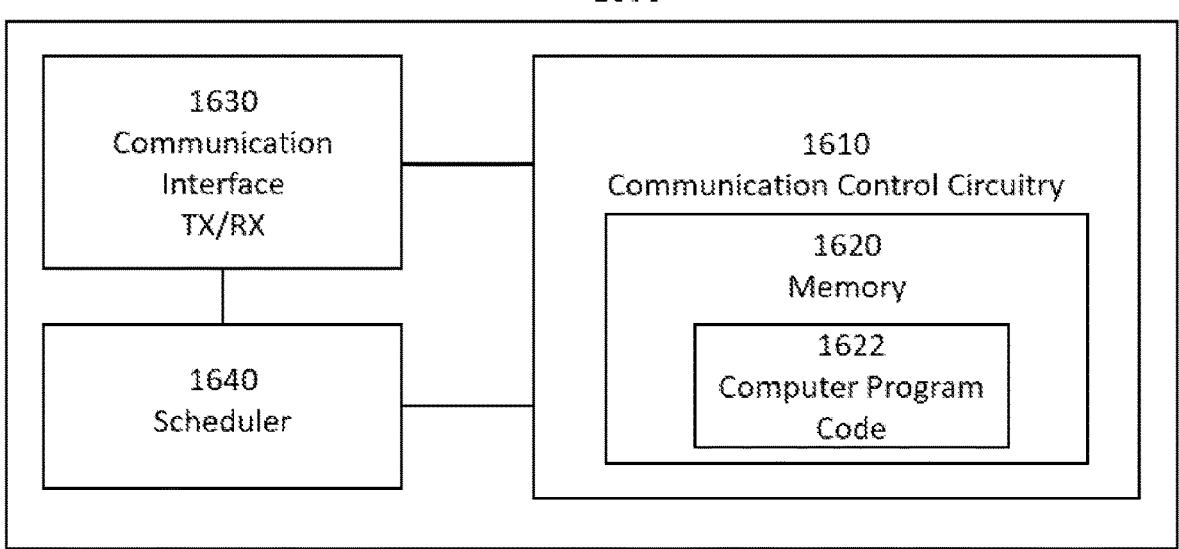

The apparatus 1600 of FIG. 16 illustrates an exemplary embodiment of an apparatus such as, or comprised in, a network element such as a base station (for example a gNB). The apparatus may comprise, for example, a circuitry or a chipset applicable to a base station to realize some of the described exemplary embodiments. The apparatus 1600 may be an electronic device comprising one or more electronic circuitries. The apparatus 1600 may comprise a communication control circuitry 1610 such as at least one processor, and at least one memory 1620 including a computer program code (software) 1622 wherein the at least one memory and the computer program code (software) 1622 are configured, with the at least one processor, to cause the apparatus 1600 to carry out some of the exemplary embodiments described above.

The memory 1620 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 1600 may further comprise a communication interface 1630 comprising hardware and/or software for realizing communication connectivity according to one or more communication protocols. The communication interface 1630 comprises at least one transmitter (TX) and at least one receiver (RX) that may be integrated to the apparatus 1600 or that the apparatus 1600 may be connected to. The communication interface 1630 provides the apparatus with radio communication capabilities to communicate in the cellular communication system. The communication interface may, for example, provide a radio interface to terminal devices. The apparatus 1600 may further comprise another interface towards a core network such as the network coordinator apparatus and/or to the access nodes of the cellular communication system. The apparatus 1600 may further comprise a scheduler 1640 that is configured to allocate resources.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s)), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising at least one processor, and at least one memory including computer program code, wherein the at least one memory and the computer program code are configured, with the at least one processor, to cause the apparatus to:

obtain information indicating a capability of a terminal device for applying an adjusted additional maximum power reduction;

receive, from the terminal device, a message comprising at least an indication of a direct current location associated with the terminal device; and determine, according to one or more pre-defined rules based at least partly on the direct current location, an amount of the adjusted additional maximum power reduction applied by the terminal device.

2. The apparatus according to claim 1, wherein the apparatus is further caused to:

transmit, to the terminal device, a request for indicating whether or not the terminal device applies the adjusted additional maximum power reduction.

3. The apparatus according to claim 1, wherein the apparatus is further caused to:

receive, from the terminal device, an indication indicating that the terminal device applies the adjusted additional maximum power reduction.

4. The apparatus according to claim 3, wherein the indication that the terminal devices applies the adjusted additional maximum power reduction is comprised in the message received from the terminal device.

5. The apparatus according to claim 1, wherein the pre-defined rule indicates to:

select a largest distance among a first distance between the direct current location and a lower edge of an uplink bandwidth part, and a second distance between the direct current location and a higher edge of the uplink bandwidth part;

identify one or more supported channel bandwidths greater than or equal to the largest distance multiplied by two;

select a smallest channel bandwidth from the one or more supported channel bandwidths identified;

if the smallest channel bandwidth is within a frequency band or a frequency band combination used by the apparatus, determine the amount of the adjusted additional maximum power reduction based on the smallest channel bandwidth with a center frequency equal to the direct current location.

6. The apparatus according to claim 1, wherein the one or more pre-defined rules indicate to:

select a largest distance among a first distance between the direct current location and a lower edge of a lowest uplink bandwidth part, and a second distance between the direct current location and a higher edge of a highest uplink bandwidth part;

identify one or more supported channel bandwidths greater than or equal to the largest distance multiplied by two;

select a smallest channel bandwidth from the one or more supported channel bandwidths identified;

if the smallest channel bandwidth is within a frequency band or a frequency band combination used by the apparatus, determine the amount of the adjusted additional maximum power reduction based on the smallest channel bandwidth with a center frequency equal to the direct current location.

7. The apparatus according to claim 1, wherein the apparatus is further caused to:

utilize the determined amount of the adjusted additional maximum power reduction for uplink power control associated with the terminal device.

8. The apparatus according to claim 1, wherein the apparatus is comprised in a base station.

9. An apparatus comprising at least one processor, and at least one memory including computer program code, wherein the at least one memory and the computer program code are configured, with the at least one processor, to cause the apparatus to:

indicate, to a network element of a wireless communication network, a capability for applying an adjusted additional maximum power reduction, wherein the capability is indicated by transmitting a first message;

determine an amount of the adjusted additional maximum power reduction according to one or more pre-defined rules based at least partly on a direct current location;

determine to apply the adjusted additional maximum power reduction with the determined amount; and transmit, to the network element, a second message comprising at least an indication of the direct current location.

10. The apparatus according to claim 9, wherein the apparatus is further caused to:

receive, from the network element, a request for indicating whether or not the apparatus applies the adjusted additional maximum power reduction.

11. The apparatus according to claim 9, wherein the apparatus is further caused to:

transmit, to the network element, an indication indicating that the apparatus applies the adjusted additional maximum power reduction.

12. The apparatus according to claim 11, wherein the indication that the apparatus applies the adjusted additional maximum power reduction is comprised in the second message.

13. The apparatus according to claim 9, wherein the one or more pre-defined rules indicate to:

select a largest distance among a first distance between the direct current location and a lower edge of an uplink bandwidth part, and a second distance between the direct current location and a higher edge of the uplink bandwidth part;

identify one or more supported channel bandwidths greater than or equal to the largest distance multiplied by two;

select a smallest channel bandwidth from the one or more supported channel bandwidths identified;

if the smallest channel bandwidth is within a frequency band or a frequency band combination used by the apparatus, determine the amount of the adjusted additional maximum power reduction based on the smallest channel bandwidth with a center frequency equal to the direct current location.

14. The apparatus according to claim 9, wherein the one or more pre-defined rules indicate to:

select a largest distance among a first distance between the direct current location and a lower edge of a lowest uplink bandwidth part, and a second distance between the direct current location and a higher edge of a highest uplink bandwidth part;

identify one or more supported channel bandwidths greater than or equal to the largest distance multiplied by two;

select a smallest channel bandwidth from the one or more supported channel bandwidths identified;

if the smallest channel bandwidth is within a frequency band or a frequency band combination used by the apparatus, determine the amount of the adjusted additional maximum power reduction based on the smallest channel bandwidth with a center frequency equal to the direct current location.

15. The apparatus according to claim 9, wherein the apparatus determines, based on at least one of a number of resource blocks, a position of the resource blocks, and/or a center frequency range, whether or not to apply the adjusted additional maximum power reduction.

16. The apparatus according to claim 9, wherein the apparatus is comprised in a terminal device.

17. A method comprising:

indicating, to a network element of a wireless communication network, a capability for applying an adjusted additional maximum power reduction, wherein the capability is indicated by transmitting a first message;

determining an amount of the adjusted additional maximum power reduction according to one or more pre-defined rules based at least partly on a direct current location;

determining to apply the adjusted additional maximum power reduction with the determined amount; and transmitting, to the network element, a second message comprising at least an indication of the direct current location.

18. The method according to claim 17, further comprising:

receiving, from the network element, a request for indicating whether or not the apparatus applies the adjusted additional maximum power reduction.

19. The method according to claim 17, further comprising:

transmitting, to the network element, an indication indicating that the apparatus applies the adjusted additional maximum power reduction.

20. The method according to claim 17, wherein the apparatus is comprised in a terminal device.

* * * * *